United States Patent [19]

Bhatti

[11] 4,402,718
[45] Sep. 6, 1983

[54] METHOD AND APPARATUS FOR FORMING GLASS FIBERS

[75] Inventor: Mohinder S. Bhatti, Newark, Ohio

[73] Assignee: Owens-Corning Fiberglas Corporation, Toledo, Ohio

[21] Appl. No.: 354,264

[22] Filed: Mar. 3, 1982

Related U.S. Application Data

[63] Continuation of Ser. No. 200,651, Oct. 27, 1980, abandoned.

[51] Int. Cl.³ .......................................... C03B 37/025
[52] U.S. Cl. ................................. 65/1; 65/2; 65/374.12; 29/163.5 R; 219/121 EM
[58] Field of Search ............. 65/1, 2, 374.12; 29/163.5 R; 219/121 EM

[56] References Cited

U.S. PATENT DOCUMENTS

| 2,555,372 | 6/1951 | Ramage ................................. 204/38 |
| 2,777,254 | 1/1957 | Siefert et al. |
| 3,132,928 | 5/1964 | Crooks et al. ......................... 29/198 |
| 3,134,659 | 5/1964 | Labino ..................................... 65/2 |
| 3,147,547 | 9/1964 | Kuebrich et al. ..................... 29/528 |
| 3,157,482 | 11/1964 | Nero et al. ............................. 65/17 |
| 3,206,846 | 9/1965 | Slayter et al. ......................... 29/470 |
| 3,235,646 | 2/1966 | Sens ........................................ 13/6 |
| 3,248,190 | 4/1966 | Woodward et al. ...................... 65/1 |
| 3,371,409 | 3/1968 | Bonnet et al. ......................... 29/528 |
| 3,461,058 | 12/1969 | Westfield et al. .................... 204/290 |
| 3,480,523 | 11/1969 | Tyrrell .................................. 204/43 |
| 3,511,306 | 5/1970 | Warkoczewski ....................... 65/15 |
| 3,518,066 | 6/1970 | Bronnes et al. ...................... 29/195 |
| 3,657,784 | 4/1972 | Selman et al. ....................... 29/195 |
| 3,736,109 | 5/1973 | Darling et al. ....................... 29/195 |
| 3,741,735 | 6/1973 | Buttle ................................... 29/198 |
| 3,827,953 | 8/1974 | Haldeman ........................... 204/37 R |
| 3,875,028 | 4/1975 | Atlee et al. ........................ 204/37 R |
| 3,947,333 | 3/1976 | Bianchi et al. ...................... 204/129 |
| 3,971,646 | 7/1976 | Rhodes ................................... 65/157 |
| 3,973,920 | 8/1976 | Tadokoro et al. ..................... 29/194 |
| 4,036,601 | 7/1977 | Weimar et al. ....................... 428/663 |
| 4,066,864 | 1/1978 | Heitmann ..................... 219/121 EM |
| 4,105,828 | 8/1978 | Burchert et al. ..................... 428/665 |
| 4,140,507 | 2/1979 | Costin et al. ............................ 65/2 |
| 4,326,871 | 4/1982 | Harris ..................................... 65/12 |

FOREIGN PATENT DOCUMENTS

| 1033627 | 6/1966 | United Kingdom ...................... 65/1 |
| 1242921 | 8/1971 | United Kingdom ...................... 65/1 |

OTHER PUBLICATIONS

Hot Isostatic Processing, MCIC-77-34 Battele Labs, Columbus, OH, Nov. 1977, pp. 1–99.

*Primary Examiner*—Robert L. Lindsay, Jr.
*Attorney, Agent, or Firm*—Ronald C. Hudgens; Robert F. Rywalski; Greg Dziegielewski

[57] ABSTRACT

A laminated wall for a feeder for supplying streams of molten glass to be attenuated into filaments is provided comprising: a refractory metal core having an oxygen impervious, precious metal sheath intimately bonded thereto by hot isostatic pressing to form a laminate, said laminate having at least one aperture therethrough, an element located in said aperture to prevent the oxidation of said core at elevated temperatures, said element having a flange at each end thereof sealed to said sheath, each flange being located intermediate said sheath and said core, said element being adapted to permit said molten glass to flow therethrough as a stream.

33 Claims, 4 Drawing Figures

U.S. Patent  Sep. 6, 1983  4,402,718
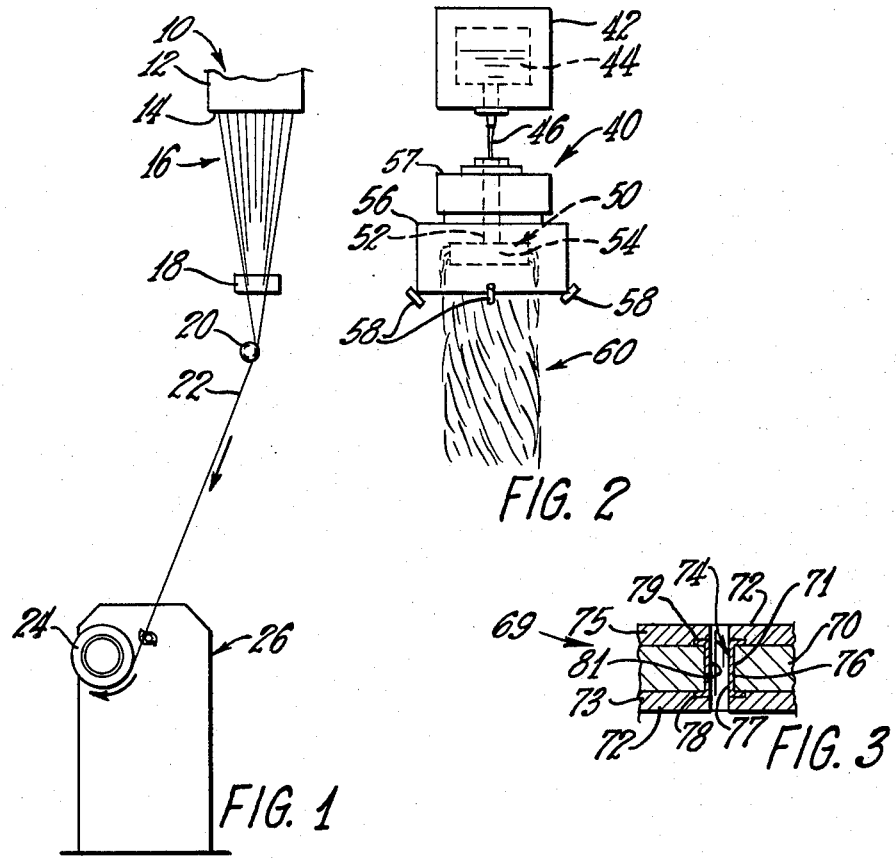
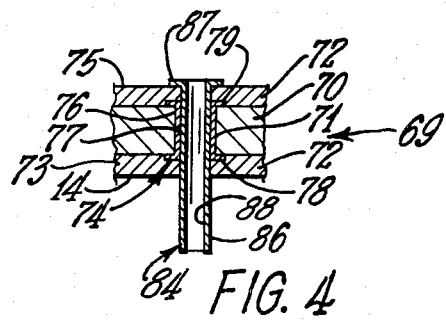

METHOD AND APPARATUS FOR FORMING GLASS FIBERS

This is a continuation of application Ser. No. 200,651, filed Oct. 27, 1980, now abandoned.

TECHNICAL FIELD

The invention disclosed herein relates to a glass fiber forming feeder having at least one laminated wall comprised of a refractory metal substrate having an oxygen impervious, precious metal sheath intimately bonded thereto by means of hot isostatically pressing the precious metal sheath to the refractory metal substrate.

BACKGROUND ART

There has been a long-felt need to produce a long lasting feeder for flowing streams of molten inorganic material, such as glass, at operating temperatures higher than currently practiced.

Much of the previous work was directed to forming alloys having superior properties over the unalloyed metals. Feeders in the textile art, or fixed bushing art, have historically been made from alloys of platinum and rhodium. Feeders in the wool art, or rotatable feeders, have been produced employing Cobalt based alloys.

The present invention provides inorganic fiber forming feeders wherein the high temperature strength characteristics of refractory metals are combined with the oxidation resistance of precious metals to produce feeders capable of operating at temperatures higher and longer periods of time than heretofore commercially practicable.

DISCLOSURE OF THE INVENTION

This invention pertains to a laminated wall for a feeder for supplying molten streams of inorganic material to be attenuated into filaments comprising a refractory metal core having an oxygen impervious precious metal sheath intimately bonded thereto by hot isostatic pressing, said wall having at least one orifice extending therethrough adapted to pass said molten material therethrough.

BRIEF DESCRIPTION OF THE DRAWINGS

FIG. 1 is a semi-schematic front elevational view of a glass textile type fiber forming system.

FIG. 2 is a semi-schematic front elevational view of a glass wool or rotary fiber forming system.

FIG. 3 is an enlarged cross sectional view of the orificed walls of the stream feeders shown in FIGS. 1 and 2.

FIG. 4 is an enlarged cross sectional view of a portion of the feeder wall similar to FIG. 3 having a hollow tubular member inserted therein.

BEST MODE OF CARRYING OUT THE INVENTION

As shown in FIG. 1, feeder 10, which is comprised of containment or sidewalls 12 and a bottom, working or stream defining wall 14, is adapted to provide a plurality of streams of molten inorganic material, such as glass. The streams of molten glass can be attenuated into filaments 16 through the action of winder 26.

As is known in the art, size applicator means 18 is adapted to provide a coating or sizing material to the surface of the glass filaments which advance to gathering shoe or means 20 to be gathered into a strand or bundle 22. Strand 22 is then wound into package 24 upon a collet of winder 26. Thus, FIG. 1 schematically represents a "textile" fiber forming system.

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds is comprised of a quill 52 and a circumferential fiberizing or working wall 54 having a plurality of orifices 77 or passageways 88 therethrough adapted to supply a plurality of streams of molten inorganic material to be fiberized.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58 as is known in the art.

As is shown in the drawings, the fiberization or working walls 14 and 54 of the feeders 10 and 50 should be based upon laminate comprised of a refractory metal core having an oxygen impervious, precious metal sheath intimately bonded thereto by hot isostatic pressing (i.e. HIP) as is disclosed in concurrently filed patent application Ser. No. 200,677, filed on Oct. 27, 1980, in the name of Mohinder S. Bhatti, which is hereby incorporated by reference.

Particularly, such refractory metals are selected from the group of materials consisting of molybdenum (Mo), columbium (Cb), tungsten (W), rhenium (Re), tantalum (Ta), hafnium (Hf), titanium (Ti), chromium (Cr), zirconium (Zr), vanadium (V) and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particulary, the precious metals are selected from a group consisting of platinum (Pt), paladium (Pd), iridium (Ir), osmium (Os), rhodium (Rh), ruthenium (Ru), and alloys based on such metals. Included in the platinum alloys are H alloy and J alloy which are alloys of platinum and rhodium of 90%/10% and 75%/25% composition, respectively.

As disclosed in the aforementioned concurrently filed patent application, care should be taken in the preparation of the surfaces of the substrate and precious metal layers to insure a good bond between the core and sheath.

Simply stated, the sheath is formed to closely conform to the exterior of the core, with the surfaces thereof being appropriately cleaned to promote a good metallurgical bond therebetween. The core is inserted or enclosed within the sheath to form a prelaminate unit having at least one edge or portion thereof open to the atmosphere to facilitate "out gasing". Then the prelaminate unit is heated in a vacuum to "out gas" the unit. Subsequent to the out gasing, the open edge or seams of the unit are welded or sealed in a vacuum, whereupon the unit is ready to be hot isostatically pressed to form laminate 69.

As shown in FIG. 3, laminate 69 is formed by hot isostatically pressing core or substrate 70 to sheath 72 and element 74. Sheath 72 and element 74 should completely cover all the exterior surfaces of core 70 to prevent the oxidation of the core during fiberization.

A plurality of apertures 71, or at least one aperture 71, extending through core 70 are formed by any suitable process, such as by drilling. Then, hollow tubular element 74 is inserted or positioned in each of the apertures 71. Element 74 may be initially supplied as a solid rod, a hollow tubular sleeve, or a hollow eyelet having a preformed first flange or head 78 along the length thereof. Preferably, flange 78 is at one end of sleeve 76 of element 74.

If element 74 is provided with a preformed first flange 78, element 74 is swaged or flared to provide a second flange 79 at the opposite end thereof to provide a precious metal liner or grommet for aperture 71 in core 70. As such, flanges 78 and 79 are preferably in firm abutting engagement with the exterior surfaces of core 70.

Subsequent to the insertion and flanging of element 74, a precious metal sheath 72 is established around core 70.

In one method, a window or picture frame of precious metal strips are provided in abutting engagement with the lateral edges of the plate-shaped core 70. Core 70 having inserts 74 therein and the picture frame of precious metal material are sandwiched between first plate 73 and second plate 75. Plates 73 and 75 are preferably of the same precious metal as the window frame and inserts 74.

Of course, core 70, sheath 72 and elements 74 should be appropriately prepared for hot isostatic pressing as set forth in the aforementioned concurrently filed patent application. Preferably, plates 73 and 75 are without any holes extending therethrough prior to laminate formation.

With all but at least one edge or section of the sheath 72 being sealed around core 70 and element 74 to form an assembly or prelaminate unit, the assembly should be heated in a vacuum chamber to "out gas" the assembly or prelaminate unit. After out gasing, the prelaminate unit should be welded or sealed in a vacuum, preferably by electron beam welding, prior to HIP'ing.

With the prelaminate unit hermetically sealed, the prelaminate unit is then hot isostatically pressed to intimately bond core 70, sheath 72 and element 74 to each other to prevent the oxidation of the core at elevated temperatures encountered during fiberization.

After HIP'ing core 70 and sheath 72 form a laminate 69 having a precious metal element intimately bonded together. The element 74 having a first flange 78 at one end and a second flange 79 at the opposite end thereof, flanges 78 and 79 being located intermediate core 70 and sheath 72.

Tubular member 84 may have passageway 88 incorporated therein prior to the insertion of tubular member 84 within orifice 77 of element 74.

If element 74 is provided as a hollow element having a sleeve 76 positioned intermediate first and second flanges 78 and 79 with an orifice 77 extending therethrough, and plates 73 and 75 are substantially hole free, orifices 77 may be easily located, since recessed dimples generally will form in the plates 73 and 75 at each orifice 77 associated therewith as a result of the HIP'ing.

As such, passageway 81, as an extension of orifice 77, can be formed through plates 73 and 75 in communication with orifice 77 to permit the molten material to flow therethrough. Thus, a "tipless" fiber forming feeder can be fabricated.

A "tip-type" fiber forming feeding may be fabricated by inserting tubular member 84 within orifice 77 such that shaft 86 extends at least partially therethrough and such that flange 87, which is established at one end of shaft 86 of tubular member 84, is in abutting engagement with sheath 72. Then, tubular member 84 should be sealed to sheath 72 and/or element 74.

Flange 87 of tubular member 84 should be sealed to sheath 72 by welding, such as by electron beam or laser welding. Preferably, tubular member 84 is hot isostatically pressed to laminate 69 such that flange 87 and shaft 86 of tubular member 84 are intimately bonded to element 74 and sheath 72 to provide electrical and thermal conductivity in addition to providing additional protection for core 70 from oxidation.

Hollow tubular member 84 can be gas pressure welded or HIP welded to laminate 69, in conformance with the Metals and Ceramics Information Center Report No. MCIC-77-34 published by the Battelle Columbus Laboratories in November, 1977.

With the tubular member 84 inserted in the laminate 69 as shown in FIG. 4, the laminate 69 and all such members 84 are placed inside a sheet metal container having a pressure transmitting media tightly packed between the container and the laminate 69 and in the passageway 88 of each tubular member 84. That is, the pressure transmitting media is tightly packed in all the space within the container not occupied by the laminate 69 and tubular members 84.

The pressure transducing or transmitting media can be of the type known in the art such as powdered metal, beaded glass such as "Vycor", or amorphous silica. Preferably, passageways 88 are snugly fitted with a solid or fully densified rod of the pressure transducing media, metal or silica, which fluidizes or softens upon the application of heat and pressure during the HIP'ing process, as should the rest of the transmitting medium, to insure a full application of pressure to the walls of hollow shaft 86 to intimately bond the exterior of shaft 86 to the sleeve 76 of element 74.

Preferably, the pressure transmitting media should not become, so fluid so as to "wick" or flow between the surfaces to be bonded together.

Subsequently, the pressure transmitting media is removed by any suitable means, such as leaching.

It is to be noted that the elements 74 and/or members 84 may by HIP welded to laminate 69 and/or each other if the flanges 78, 79 and 87 are hermetically sealed or welded (e.g., EB welded) to laminate 69, in the argon fluid of a conventional HIP'ing system. That is, the sheet metal box and special pressure transducing media may be dispensed with.

Thus, with HIP welding, flange 87 is metallurgically bonded to sheath 72, and shaft 86 is metallurgically bonded to element 74 to provide a laminated feeder fiberization wall 14 wherein the tubular member 84 is in good electrical and thermal contact with laminate 69.

Preferably, element 74 and member 84 are of the same type of precious metal material as sheath 72, although different but compatible materials may be employed.

Since refractory metals are highly creep resistant, or even substantially "creep" free, even at elevated temperatures, fiber forming feeders produced according to the principles of this invention have good "sag" resistance. That is, the fiberization walls should not deform or bow as much as an all precious metal feeder. In some instances "sag" can be substantially eliminated over the life of the feeder. Thus finshield alignments and the like with respect to the fiberization wall and/or tips can remain essentially fixed over the life of the feeder.

Laminate 69 can be fabricated as a substantially flat wall to provide a fiberization wall 14, generally, for a textile type feeder, or laminate 69 can be fabricated into a cylindrical fiberization wall 54 having orifices 77 and/or passageway 88 extending radially outward from the axis of rotation thereof generally for wool operations respectively.

In either case, orifices 77 and/or passageways 81 and 88 should be properly sized to permit the molten glass or inorganic material to flow therethrough in either a stationary or rotatable fiber forming system.

Other systems provided for a precious metal insert or member to protect the refractory metal core exposed by the orifices extending therethrough are set forth in the following concurrently filed patent applications: Ser. No. 200,676, filed on Oct. 27, 1980 in the names of Mohinder S. Bhatti and Alfred Marzocchi; Ser. No. 200,650, filed on Oct. 27, 1980 in the names of Mohinder S. Bhatti and Alfred Marzocchi; Ser. No. 200,647, filed on Oct. 27, 1980 in the name of Mohinder S. Bhatti, all of which are hereby incorporated by reference.

It is apparent that within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the formation of continuous and/or staple glass filaments.

I claim:

1. A laminated wall for a feeder for supplying streams of molten glass to be attenuated into filaments comprising:
   a refractory metal core having an oxygen impervious, precious metal sheath intimately bonded thereto by hot isostatic pressing to form a laminate, said laminate having at least one aperture therethrough;
   an element located in said aperture to prevent the oxidation of said core at elevated temperatures, said element having a flange at each end thereof sealed to said sheath, each flange being located intermediate said sheath and said core, said element being adapted to permit said molten material to flow therethrough.

2. The feeder wall of claim 1 wherein said element is made from a precious metal.

3. The feeder wall of claim 2 further comprising a hollow tubular member joined to the laminate to define the streams of molten material.

4. The feeder wall of claim 1 wherein the core is a material selected from the group consisting of Ti, V, Cb, Ta, Cr, Mo, W, Re and base alloys thereof and wherein said sheath is a material of the group consisting of Pt, Pd, Ir, Os, Rh, Ru and base alloys thereof.

5. The feeder wall of claim 1 wherein said refractory metal is an alloy of Mo, Ti, and Zr.

6. The feeder wall of claim 5 wherein said sheath is an alloy of Pt and Rh.

7. The feeder wall of claim 5 wherein said tubular member is located, at least partially, within an orifice extending through said element.

8. The method of making a laminated wall for an inorganic fiber forming feeder comprising:
   providing a refractory metal core having at least one aperture extending therethrough;
   positioning an element in said aperture;
   establishing a flange at each end of said element adjacent opposite sides of said core;
   establishing a precious metal sheath around said core having said element therein to form a prelaminate unit; and
   hot isostatically pressing said prelaminate unit to intimately bond said core, sheath and element together to prevent the oxidation of the core at elevated temperatures, said element being adapted to permit said molten material to flow therethrough.

9. The method of claim 8 wherein said element has an orifice extending therethrough prior to positioning said element in said aperture.

10. The method of claim 9 wherein said element is made of a precious metal.

11. The method of claim 8 wherein the core is a material selected from the group consisting of Ti, V, Cb, Ta, Cr, Mo, W, Re and base alloys thereof and wherein said sheath is a material of the group consisting of Pt, Pd, Ir, Os, Rh, Ru and base alloys thereof.

12. The method of claim 11 further comprising joining a hollow tubular member to said laminate adapted to define a stream of said molten inorganic material therethrough.

13. The feeder wall produced according to the method of claims 8, 9, 11 or 12.

14. The method of forming glass fibers comprising:
    providing a refractory metal core having an oxygen impervious, precious metal sheath intimately bonded thereto by hot isostatic pressing to form a laminate, said laminate having at least one aperture therethrough; an element located in said aperture to prevent the oxidation of said core at elevated temperatures, said element having a flange at each end thereof sealed to said sheath, each flange being located intermediate said sheath and said core, said element being adapted to permit said molten material to flow therethrough; and
    attenuating the streams of molten glass into fibers.

15. The feeder wall of claim 1 wherein said feeder is substantially stationary.

16. The feeder wall of claim 1 wherein said feeder is rotatable.

17. A laminated wall for a feeder for supplying streams of molten glass to be attenuated into filaments comprising:
    a refractory metal core having an oxygen impervious, precious metal first layer intimately bonded thereto by hot isostatic pressing to form a laminate, said laminate having at least one aperture therethrough;
    an element located in said aperture, said element having a first flange at an end thereof sealed to said first layer, said flange being located intermediate said first layer and said core, said element being adapted to permit said molten material to flow therethrough.

18. The feeder wall of claim 17 wherein said core has an oxygen impervious, precious metal, second layer intimately bonded thereto by hot isostatic pressing to form said laminate and wherein said element has a second flange at the opposite end thereof sealed to said second layer, said second flange being located intermediate said core and said second layer.

19. The method of making a laminated wall for an inorganic fiber forming feeder comprising:
    providing a refractory metal core having at least one aperture extending therethrough;
    positioning an element in said aperture;

establishing a first flange at an end of said element adjacent a side of said core;

providing an oxygen impervious precious metal first layer along said core having said element therein to form a prelaminate unit; and hot isostatically pressing said prelaminate unit to intimately bond said core, first layer and element together such that said first flange is positioned intermediate said core and said first layer, said element being adapted to permit said molten material to flow therethrough.

20. The method of claim 19 further comprising establishing a second flange at the opposite end of said element adjacent the opposite side of said core; and providing an oxygen impervious, precious metal, second layer along said core such that said second flange is located intermediate said core and said second layer to form said prelaminate unit.

21. A feeder for supplying streams of molten glass to be attenuated into filaments comprising:

a plurality of layers of material wherein one of said layers is a refractory metal and another of said layers is an oxygen impervious, precious metal, said plurality of layers being intimately bonded together by the application of isostatic pressure and heat to form a unitary laminate, said laminate having a plurality of apertures extending therethrough; and a plurality of elements bonded to the laminate and positioned in said apertures to prevent the oxidation of the refractory metal at elevated temperatures, said elements having (a) an orifice adapted to permit the molten glass of flow therethrough to provide said streams of molten glass and (b) a flange at an end thereof, said flange being located intermediate said precious metal layer and said refractory metal layer.

22. A feeder for flowing a stream of molten inorganic material therethrough comprising:

a plurality of layers of material wherein one of said layers is a refractory metal and another of said layers is an oxygen impervious, precious metal, said plurality of layers being intimately bonded together by the application of isostatic pressure and heat to form a unitary laminate, said laminate having an aperture extending; and an element bonded to the laminate and positioned in said aperture to prevent the oxidation of the refractory metal at elevated temperatures, said element having (a) an orifice adapted to permit the molten material to flow therethrough and (b) a flange at an end thereof, said flange being located intermediate said precious metal layer and said refractory metal layer.

23. The feeder of claims 21 or 22 wherein said refractory metal and said precious metal are intimately bonded together.

24. The feeder of claim 23 where said refractory metal and said precious metal are metalurgically bonded together.

25. The feeder of claim 21 wherein said plurality of layers include a second precious metal layer, and wherein said elements have a second flange at the opposite end thereof positioned intermediate said second precious metal layer and said refractory metal layer.

26. The feeder of claims 21, 22 or 25 wherein the refractory metal layer is a material selected from the group consisting of Ti, V, Cb, Ta, Cr, Mo, W, Re and base alloys thereof and wherein said precious metal layer is a material of the group consisting of Pt, Pd, Ir, Os, Rh, Ru and base alloys thereof.

27. The feeder of claim 22 wherein said element is a material of the group consisting of Pt, Pd, Ir, Os, Rh, Ru and base alloys thereof and wherein said element is intimately bonded to said refractory metal.

28. The feeder of claim 21 wherein another of said layers is a second precious metal layer positioned on the opposite side of the refractory metal layer from the other precious metal layer and wherein said elements have a second flange at the opposite end thereof, said second flange being positioned intermediate said refractory metal layer and said second precious metal layer.

29. A method of making a feeder for supplying streams of molten glass to be attenuated into filaments comprising:

assembling a plurality of layers of material wherein one of said layers is a refractory metal and another of said layers is a precious metal, said refractory metal layer having a plurality of elements positioned in apertures therein, said element having a flange at an end thereof, said flange being positioned between said refractory metal layer and said precious metal layer;

isostatically pressing said plurality of layers;

heating the isostatically pressed layers to intimately bond the plurality of layers to form a unitary laminate and to bond said elements to the laminate; and forming an orifice in said elements to permit the molten glass to issue therefrom as said streams, said precious metal layer and said elements preventing the oxidation of said refractory metal layer at elevated temperatures.

30. A method of making a feeder for flowing a stream of molten inorganic material therethrough comprising:

assembling a plurality of layers of material wherein one of said layers is a refractory metal and another of said layers is a precious metal, said refractory metal layer having a plurality of elements positioned in apertures therein, said element having a flange at an end thereof, said flange being positioned between said refractory metal layer and said precious metal layer;

isostatically pressing said plurality of layers;

heating the isostatically pressed layers to intimately bond the plurality of layers to form a unitary laminate and to bond said element to the laminate; and forming an orifice in said element to permit the molten material to flow therethrough, said precious metal layer and said element preventing the oxidation of said refractory metal layer at elevated temperatures.

31. The method of claims 29 or 30 wherein the refractory metal layer is a material selected from the group consisting of Ti, V, Cb, Ta, Cr, Mo, W, Re and base alloys thereof and wherein said precious metal layer and said element are a material of the group consisting of Pt, Pd, Ir, Os, Rh, Ru and base alloys thereof.

32. The method of claim 31 wherein the refractory metal is intimately bonded to said precious metal.

33. The method of claim 32 wherein the refractory metal is diffusion bonded to said precious metal.

* * * * *